US012450513B2

(12) United States Patent
Weber et al.

(10) Patent No.: US 12,450,513 B2
(45) Date of Patent: Oct. 21, 2025

(54) QUANTUM CONTROLLER VALIDATION

(71) Applicant: Quantum Machines, Tel Aviv (IL)

(72) Inventors: Ori Weber, Tel Aviv (IL); Tamar Ben Haim Sembira, Tel Aviv (IL); Lior Ella, Tel Aviv (IL); Yonatan Cohen, Tel Aviv (IL); Nissim Ofek, Tel Aviv (IL); Itamar Sivan, Tel Aviv (IL)

(73) Assignee: Q.M Technologies Ltd. (IL)

( * ) Notice: Subject to any disclaimer, the term of this patent is extended or adjusted under 35 U.S.C. 154(b) by 814 days.

(21) Appl. No.: 17/828,556

(22) Filed: May 31, 2022

(65) Prior Publication Data
US 2023/0385672 A1    Nov. 30, 2023

(51) Int. Cl.
G06N 10/20    (2022.01)
G06N 10/80    (2022.01)

(52) U.S. Cl.
CPC ............. *G06N 10/20* (2022.01); *G06N 10/80* (2022.01)

(58) Field of Classification Search
CPC .................................................. G06N 10/20
USPC .......................................................... 706/62
See application file for complete search history.

(56) References Cited

U.S. PATENT DOCUMENTS

| | | | | |
|---|---|---|---|---|
| 4,875,484 A * | 10/1989 | Anzai | ................ | A61N 1/36021 607/46 |
| 6,223,228 B1 * | 4/2001 | Ryan | ........................ | G06F 1/04 714/E11.166 |
| 6,426,984 B1 * | 7/2002 | Perino | ........................ | G06F 1/10 375/377 |
| 6,993,108 B1 * | 1/2006 | Chi | ........................ | H03L 7/0814 375/376 |
| 7,451,292 B2 * | 11/2008 | Routt | ........................ | G06N 10/80 711/212 |
| 7,535,931 B1 * | 5/2009 | Zampetti | ........................ | H03L 7/08 370/252 |

(Continued)

FOREIGN PATENT DOCUMENTS

| | | |
|---|---|---|
| CA | 2420022 | 2/2003 |
| CN | 104467843 | 3/2015 |

(Continued)

OTHER PUBLICATIONS

U.S. Appl. No. 62/294,966, filed Feb. 12, 2016.

(Continued)

*Primary Examiner* — Reza Nabi
(74) *Attorney, Agent, or Firm* — McAndrews, Held & Malloy, Ltd.

(57) ABSTRACT

Quantum algorithms are performed via a quantum computer, by generating a quantum control pulse in a quantum controller and transmitting the quantum control pulse to a quantum processor. The quantum control pulse interacts with a qubit in the quantum processor. Within the quantum controller, a pulse processor generates a plurality of raw pulses that are modified by a front end hardware module. During the normal operation of the quantum controller, samples of the raw and/or modified pulses may be selected and saved to memory. During a design for validation (DFV) mode, the proper operation of the quantum controller is determined according to a simulation of the quantum controller and the saved samples. The DFV mode may be performed in parallel with normal operation without affecting the resources of the quantum controller.

62 Claims, 4 Drawing Sheets

(56) References Cited

U.S. PATENT DOCUMENTS

| | | | | |
|---|---|---|---|---|
| 7,627,126 | B1* | 12/2009 | Pikalo | H04L 9/0858 |
| | | | | 713/168 |
| 8,315,969 | B2* | 11/2012 | Roetteler | G06N 10/40 |
| | | | | 706/62 |
| 8,385,878 | B2* | 2/2013 | Rao | H04W 56/0035 |
| | | | | 455/127.5 |
| 8,750,717 | B1* | 6/2014 | Yap | G02F 2/02 |
| | | | | 398/163 |
| 9,207,672 | B2* | 12/2015 | Williams | G06N 10/40 |
| 9,400,499 | B2 | 7/2016 | Williams | |
| 9,509,324 | B2* | 11/2016 | McDonald | H03L 7/24 |
| 9,663,358 | B1* | 5/2017 | Cory | B82Y 10/00 |
| 9,692,423 | B2* | 6/2017 | McDermott, III | |
| | | | | H03K 19/1954 |
| 9,847,121 | B2* | 12/2017 | Frank | G06N 10/40 |
| 9,858,531 | B1* | 1/2018 | Monroe | G06N 10/40 |
| 9,892,365 | B2 | 2/2018 | Rigetti | |
| 9,978,020 | B1* | 5/2018 | Gambetta | H03M 13/154 |
| 9,979,400 | B1 | 5/2018 | Sete | |
| 9,996,801 | B2* | 6/2018 | Shim | G11C 11/44 |
| 10,063,228 | B2 | 8/2018 | Deurloo et al. | |
| 10,122,351 | B1* | 11/2018 | Naaman | H03K 19/1952 |
| 10,127,499 | B1* | 11/2018 | Rigetti | G06F 9/3877 |
| 10,192,168 | B2 | 1/2019 | Rigetti | |
| 10,223,643 | B1* | 3/2019 | Bishop | G06N 10/70 |
| 10,333,503 | B1* | 6/2019 | Cohen | H03K 19/195 |
| 10,454,459 | B1* | 10/2019 | Cohen | H03K 3/38 |
| 10,496,069 | B2* | 12/2019 | Nazarathy | G05B 13/04 |
| 10,505,524 | B1* | 12/2019 | Cohen | H03K 3/38 |
| 10,560,076 | B1* | 2/2020 | Cohen | G06N 10/60 |
| 10,637,449 | B1 | 4/2020 | Cohen et al. | |
| 10,659,018 | B1 | 5/2020 | Cohen | |
| 10,666,238 | B1 | 5/2020 | Cohen | |
| 10,872,021 | B1* | 12/2020 | Tezak | G06F 11/273 |
| 10,958,253 | B1* | 3/2021 | Cohen | H03K 19/195 |
| 10,985,739 | B2 | 4/2021 | Cohen et al. | |
| 11,010,145 | B1* | 5/2021 | Smith | G06F 8/41 |
| 11,463,075 | B2 | 10/2022 | Cohen et al. | |
| 11,616,497 | B2 | 3/2023 | Cohen et al. | |
| 11,616,498 | B2* | 3/2023 | Cohen | G06N 10/40 |
| | | | | 327/291 |
| 2004/0266084 | A1* | 12/2004 | Fujishima | B82Y 10/00 |
| | | | | 438/200 |
| 2005/0180575 | A1* | 8/2005 | Maeda | H04L 9/0852 |
| | | | | 380/278 |
| 2006/0093376 | A1* | 5/2006 | Mitchell | H04B 10/70 |
| | | | | 398/183 |
| 2007/0194225 | A1* | 8/2007 | Zorn | G01Q 30/10 |
| | | | | 250/306 |
| 2008/0037693 | A1* | 2/2008 | Andrus | H04L 25/4904 |
| | | | | 375/359 |
| 2011/0035511 | A1* | 2/2011 | Biederman | G04G 7/00 |
| | | | | 709/248 |
| 2011/0238378 | A1* | 9/2011 | Allen | B82Y 10/00 |
| | | | | 702/186 |
| 2013/0198499 | A1* | 8/2013 | Dice | G06F 9/30079 |
| | | | | 712/E9.032 |
| 2016/0125311 | A1* | 5/2016 | Fuechsle | H10N 69/00 |
| | | | | 257/31 |
| 2016/0267032 | A1* | 9/2016 | Rigetti | G06N 10/40 |
| 2016/0292586 | A1 | 10/2016 | Rigetti et al. | |
| 2017/0094618 | A1* | 3/2017 | Bjorkengren | H04W 56/001 |
| 2017/0214410 | A1* | 7/2017 | Hincks | G06N 10/20 |
| 2017/0364796 | A1* | 12/2017 | Wiebe | A01D 5/00 |
| 2018/0013426 | A1* | 1/2018 | Deurloo | G06N 10/20 |
| 2018/0032893 | A1* | 2/2018 | Epstein | G06F 15/82 |
| 2018/0091244 | A1* | 3/2018 | Abdo | H03H 7/46 |
| 2018/0107579 | A1* | 4/2018 | Chapman | G06F 11/3419 |
| 2018/0123597 | A1* | 5/2018 | Sete | G06N 10/70 |
| 2018/0237039 | A1* | 8/2018 | Mong | B61L 23/005 |
| 2018/0260245 | A1* | 9/2018 | Smith | G06F 15/163 |
| 2018/0260730 | A1* | 9/2018 | Reagor | G06F 15/82 |
| 2018/0260732 | A1* | 9/2018 | Bloom | G06N 10/70 |
| 2018/0308007 | A1* | 10/2018 | Amin | B82Y 10/00 |
| 2018/0322409 | A1* | 11/2018 | Barends | G06F 17/16 |
| 2018/0365585 | A1 | 12/2018 | Smith | |
| 2018/0373995 | A1* | 12/2018 | Tomaru | G06N 10/20 |
| 2018/0375650 | A1* | 12/2018 | Legre | H04L 9/0631 |
| 2019/0042964 | A1* | 2/2019 | Elsherbini | H01L 23/4855 |
| 2019/0042965 | A1* | 2/2019 | Clarke | G06F 8/447 |
| 2019/0042970 | A1* | 2/2019 | Zou | G06F 9/3877 |
| 2019/0042971 | A1* | 2/2019 | Zou | G06F 9/30 |
| 2019/0042972 | A1* | 2/2019 | Zou | G06F 9/22 |
| 2019/0042973 | A1* | 2/2019 | Zou | G06F 9/3016 |
| 2019/0049495 | A1* | 2/2019 | Ofek | G06N 10/70 |
| 2019/0180197 | A1* | 6/2019 | Granade | G06N 10/20 |
| 2019/0245685 | A1* | 8/2019 | Yoshino | H04J 7/00 |
| 2019/0251478 | A1* | 8/2019 | Bishop | G06F 17/16 |
| 2019/0266512 | A1* | 8/2019 | Shen | G06N 10/70 |
| 2019/0302832 | A1* | 10/2019 | Morgan | H03K 3/037 |
| 2019/0385088 | A1* | 12/2019 | Naaman | H04L 49/101 |
| 2019/0394242 | A1* | 12/2019 | Wig | G06N 5/048 |
| 2019/0394243 | A1* | 12/2019 | Wiig | G06N 3/043 |
| 2020/0183814 | A1* | 6/2020 | Liu | G06N 10/80 |
| 2020/0285986 | A1* | 9/2020 | Javadiabhari | G06F 11/0754 |
| 2020/0293080 | A1* | 9/2020 | Poon | H03K 5/1565 |
| 2020/0342347 | A1* | 10/2020 | Gambetta | G06N 10/70 |
| 2020/0364602 | A1* | 11/2020 | Niu | G06N 10/40 |
| 2021/0004707 | A1* | 1/2021 | Gambetta | G06N 20/00 |
| 2021/0103847 | A1* | 4/2021 | Akzam | G06N 10/60 |
| 2021/0125096 | A1* | 4/2021 | Puri | G06N 10/40 |
| 2022/0260358 | A1* | 8/2022 | Moon | G01B 9/02007 |
| 2023/0040584 | A1* | 2/2023 | Baker | G06F 17/16 |
| 2023/0049157 | A1* | 2/2023 | Sawlani | G05B 19/41885 |
| 2023/0274177 | A1* | 8/2023 | Endres | G06N 10/70 |
| | | | | 702/186 |
| 2023/0316119 | A1* | 10/2023 | Mukherjee | G06N 10/20 |
| | | | | 706/62 |
| 2023/0385672 | A1* | 11/2023 | Weber | G06N 10/20 |
| 2024/0020221 | A1* | 1/2024 | Griffin | G06N 10/00 |
| 2024/0311679 | A1* | 9/2024 | Cruz Benito | G06N 3/08 |
| 2025/0131315 | A1* | 4/2025 | Takeuchi | G06N 10/70 |

FOREIGN PATENT DOCUMENTS

| | | |
|---|---|---|
| CN | 105281886 A | 1/2016 |
| CN | 105912070 A | 8/2016 |
| CN | 108111306 A | 6/2018 |
| CN | 110085094 A | 8/2019 |
| CN | 110677210 | 1/2020 |
| CN | 111464154 A | 7/2020 |
| CN | 111767055 A | 10/2020 |
| CN | 112019193 A | 12/2020 |
| CN | 112149832 A | 12/2020 |
| EP | 0388052 | 9/1990 |
| JP | 2011175078 A | 9/2011 |
| JP | 2012188875 | 10/2012 |
| WO | 2015178991 A2 | 11/2015 |
| WO | 2015178992 A2 | 11/2015 |
| WO | 2017078735 A1 | 5/2017 |
| WO | 2017123940 | 7/2017 |
| WO | 2017139683 A1 | 8/2017 |
| WO | 2018055607 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021/123903 | 6/2021 |

OTHER PUBLICATIONS

Int'l Search Report and Written Opinion Appln No. PCT/IB2019/001410 mailed Jun. 10, 2020.
Int'l Search Report and Written Opinion Appln No. PCT/IB2019/001394 mailed Jun. 17, 2020.
Zhang J, Hegde SS, Suter D. Pulse sequences for controlled 2-and 3-qubit gates in a hybrid quantum register. arXiv preprint arXiv:1806.08408. Jun. 21, 2018.
Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

(56) References Cited

OTHER PUBLICATIONS

Int'l Search Report and Written Opinion Appln No. PCT/IB2020/000218 mailed Aug. 11, 2020.
Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).
Int'l Search Report and Written Opinion Appln No. PCT/IB2020/000376 mailed Sep. 17, 2020.
Breitfelder et al. eds., IEEE 100: The Authoritative Dictionary of IEEE Standards Terms 1247, definition 2 of "variable" (7th ed. 2000). (Year: 2000).
Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf > McDermott R. et al. Oct. 12, 2017 (Ot. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", Micro-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.
Cross et al. "Open Quantum Assembly Language", Jan. 10, 2017.
European Office Communication with extended Search Report Appln No. 20766036.6 dated Nov. 24, 2022.
Japanese Patent Office Action Appln No. 2021-529723 dated Oct. 26, 2022 with translation.

\* cited by examiner

QUANTUM CONTROLLER VALIDATION

BACKGROUND

Limitations and disadvantages of conventional methods and systems for quantum computing will become apparent to one of skill in the art, through comparison of such approaches with some aspects of the present method and system set forth in the remainder of this disclosure with reference to the drawings.

BRIEF SUMMARY

Methods and systems are provided for quantum controller validation, substantially as illustrated by and/or described in connection with at least one of the figures, as set forth more completely in the claims.

DETAILED DESCRIPTION

Figure 1:
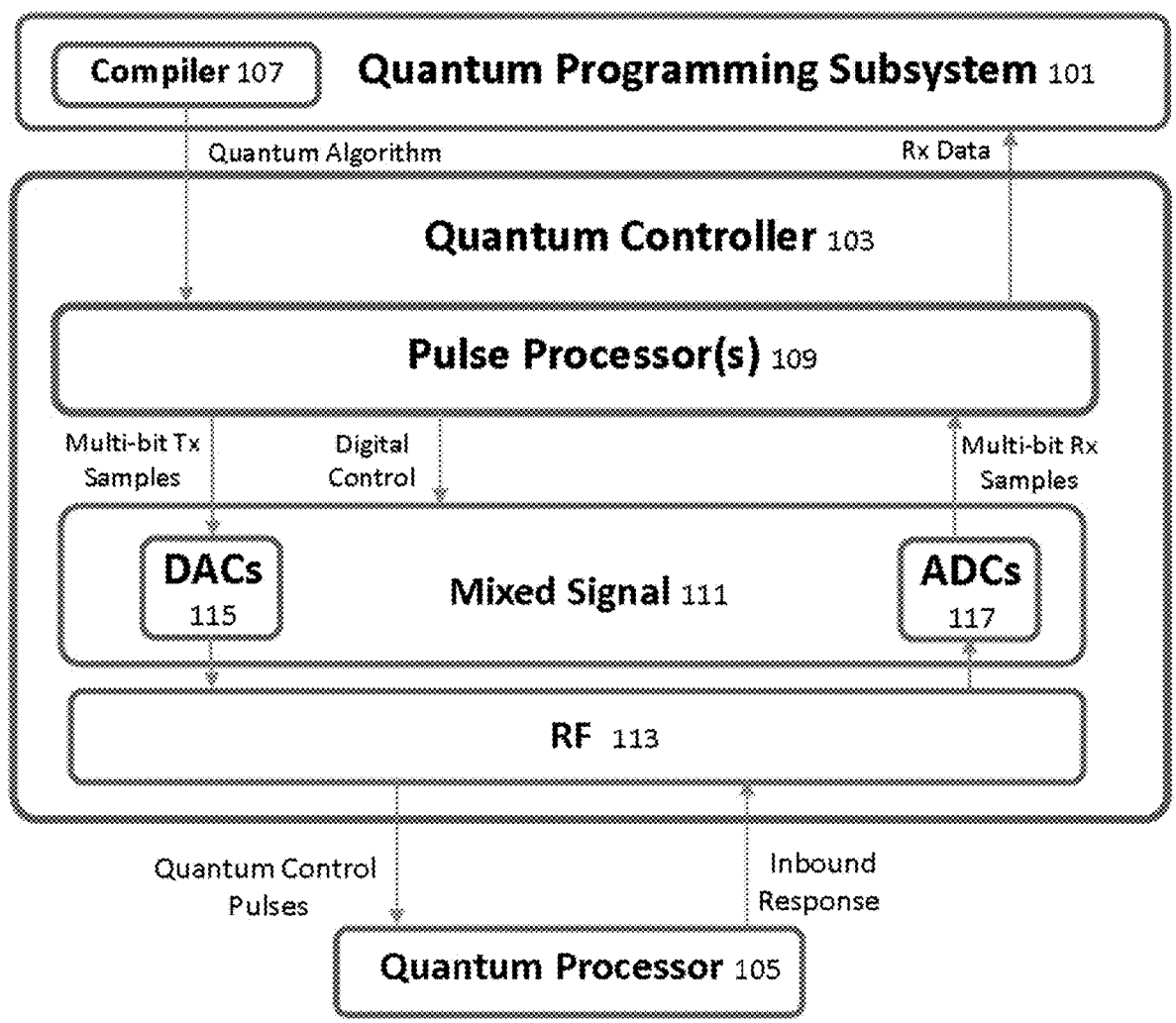
FIG. 1 illustrates an example quantum orchestration platform (QOP) in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle + \beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix}$$

and $$\begin{bmatrix}0\\1\end{bmatrix},$$

respectively. The qubit state may represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

many physical implementations of qubits have been proposed and developed over the years. Some examples of qubits implementations include superconducting circuits, spin qubits, and trapped ions.

FIG. 1 illustrates an example quantum orchestration platform (QOP) in accordance with various example implementations of this disclosure. The QOP comprises a quantum programming subsystem 101, a quantum controller (QC) 103 and a quantum processor 105.

The quantum programming subsystem 101 comprises a compiler 107 that is operable to generate machine code from a high-level quantum algorithm description. The machine code comprises a series of binary vectors that represent instructions that the QC 103 can interpret and execute directly, to generate the necessary outbound quantum control pulses for the quantum algorithm, with little or no human intervention during runtime. The outbound quantum control pulses are coupled to the quantum processor 105 to execute the quantum algorithm.

In an example implementation, the quantum programming system 101 is a personal computer comprising a processor, memory, and other associated circuitry (e.g., an x86 or x64 chipset). The quantum programming subsystem 101 may be coupled to the QC 103 via an interconnect which may, for example, utilize a universal serial bus (USB), a peripheral component interconnect (PCIe) bus, wired or wireless Ethernet, or any other suitable communication protocol.

The QC 103 generates the precise series of external signals (e.g., pulses of electromagnetic waves and pulses of baseband voltage) to perform the desired logic operations to carry out the desired quantum algorithm via the quantum processor 105. For example, pulses of electromagnetic waves may be sent to one or more qubits in the quantum processor 105, thereby manipulating a state of the qubits. One or more readout resonators in the quantum processor 105 may be configured to read the state of the qubits and pass this information back to the QC 103. Depending on the quantum algorithm to be performed, outbound pulse(s) for carrying out the algorithm may be predetermined at design time and/or during runtime. The runtime determination of the pulses may require classical calculations and processing in the QC 103. This runtime analysis may be based on inbound pulses received from the quantum processor 105.

During runtime and/or upon completion of a quantum algorithm performed by the QC 103, the QC 103 may output data/results to the quantum programming subsystem 101. In an example implementation, these results may be used to generate a new quantum algorithm description for a subsequent run of the quantum algorithm and/or update the quantum algorithm description during runtime.

A QC 103 comprises one or more pulse processors 109, which may be implemented in a field programmable gate array, an application specific integrated circuit or the like. A pulse processor 109 is operable to control outbound pulses that drive a quantum element (e.g., one or more qubits and/or resonators) in the quantum processor 105. A pulse processor 109 is also operable to receive inbound pulses from a quantum element, to perform runtime analysis for example.

Quantum algorithms are performed by one or more quantum elements of the quantum processor 105 interacting with quantum control pulses. The quantum processor 105 consists of several quantum elements, e.g., qubits, resonators and flux line. A readout resonator is coupled to the qubits. The resonating frequency of a resonator depends on the qubit state. Sending an outbound pulse from the QC to the resonator would result in an inbound response back to the QC that depends on the qubit state which can be extracted by classical computation. A flux line is an element that can couple 2 qubits to perform a 2 qubit gate, or to a single qubit to manipulate its state and resonating frequency.

A quantum control pulse may be electromagnetic RF signal. The electromagnetic RF signals may be generated by upconverting a baseband or intermediate frequency (IF) analog waveform in an RF circuit 113. Alternatively, RF signals may be directly modulated. The pulse processor 109 may digitally generate and modify samples of the analog waveform.

The pulse processor 109 is configured to execute the control flow of a quantum algorithm program using one or more classical processors. The classical processors are able to perform classical computations and impact the flow of the quantum program and/or the transmitted pulses. A classical processor may be configured to control a physical layer module to generate analog waveforms and digital signaling. The pulse processor 109 may be configured to shape and modulate the analog waveforms according to control signals from the classical processor. These control signals may also depend on the previous measurements.

The digital signaling may be used as digital markers that follow the analog pulses as the analog pulses are fed through the mixed signal circuit 111 and the RF circuit 113. The digital marker may be used to: activate laboratory auxiliary measurement equipment (e.g., a scope, a photon detector), operate auxiliary equipment that is essential to execute the program, dynamically control a digital gate, and capture the inbound readout response of the qubits to send the user raw data for post processing and analysis. The dynamic control of the digital gate may enable the analog waveform transmission to the quantum element, while the QC 103 plays analog data to the quantum element to reduce noise when not playing to the element.

The analog waveforms are sent to various DAC channels 115 in a mixed signal circuit 111. The DACs 115 are operable to convert the analog waveforms from a digital representation to an analog signal that is modulated, upconverted by the RF circuit 113 and used to excite a quantum element such as a qubit in a quantum processor 105. To generate results from the quantum algorithm program, the pulse processor(s) 109 are also operable to receive, via one or more downconverters in the RF circuit 113 and ADCs 117 in the mixed signal circuit 111, readout responses from a resonator in the quantum processor 105. The classical processor(s) in the pulse processor(s) 109 are operable to perform state estimation on the readout responses to affect the program dynamic branching as well as result generation. Any classical parameter (e.g. frequency, phase, chirp rate, etc. . . . ) may also be modified according to previous measurements.

While individual components may be verified to some extent standalone, a full system validation is required to ensure that the integrated products works as a unit. Typically, the validation of one quantum controller requires the acquisition of a set of analog signals that are processed and checked against expected results. Difficulty arises because the DAC converters used for acquisition may add noise and distortion to a purely digital outbound signal. Validating a large set of quantum controllers is typically even more difficult due to the scale-up. A complex hardware switch is usually required to dynamically route such a large set of DAC outputs into a small set of scope channels.

The disclosed validation system does not require an expensive hardware switch or a manually connection of DAC outputs to limited scope channels. The disclosed validation system does not require complex data analysis to remove noise from the captured analog data. The disclosed validation system is automated, scalable and accurate to a selectable resolution of the DACs.

Figure 2:
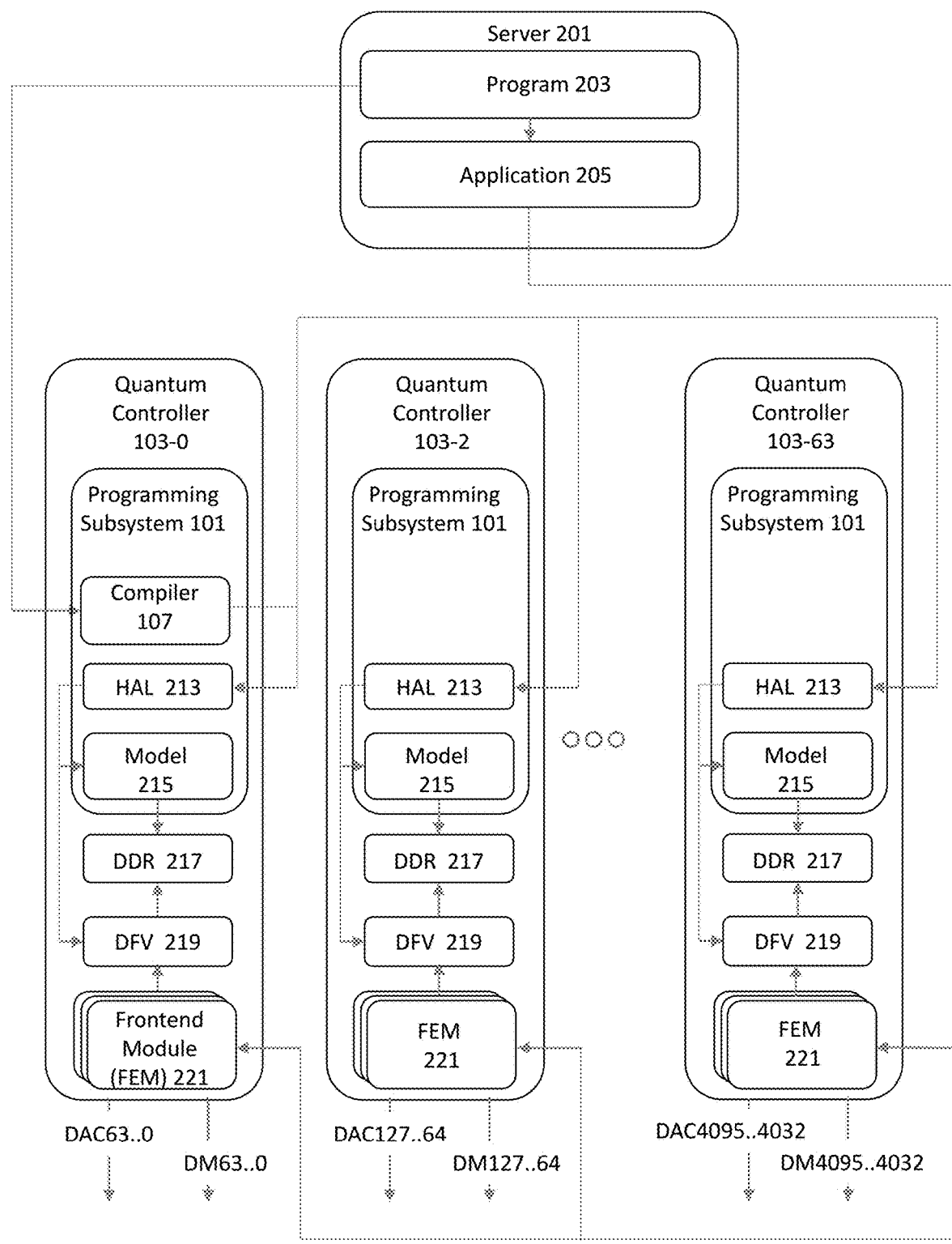
FIG. 2 illustrates an example QOP with quantum controller (QC) validation in accordance with various example implementations of this disclosure.

FIG. 2 illustrates an example QOP with QC validation using a behavior model in accordance with various example implementations of this disclosure.

An external server 201 stores a high-level quantum algorithm description 203 that is sourced for the application layer 205. The program 203 is compiled by compiler 107.

The application layer 205 provides raw analog and digital waveforms to front end modules 221 of the QOP.

While the system of FIG. 1 illustrates a single quantum controller 103 and an external quantum programming subsystem 101 with a compiler 107, the system of FIG. 2 illustrates multiple quantum controllers 103-0, 103-1 . . . 103-63, each with an embedded quantum programming subsystem 101. The compiler 107 inside the embedded quantum programming subsystems 101 of quantum controller 103-0 is operable to send programming directives to all other quantum controllers 103-1 . . . 103-63 via an Ethernet connection of some other medium having similar functionality. A system with multiple quantum controllers may also locate the compiler 107 either in an external quantum programming subsystem (i.e., external computer or server).

A programming model of the controller 215 runs on an embedded programming subsystem 209 (e.g., ARM CPU). The model 215 is cycle accurate with regards to the quantum interface (ADC, DAC, and functional communication between pulse processors or controllers). The model 215 also comprises the higher level interactions between software, memory and design for validation (DFV). The DFV comprises dedicated logic that may capture digital and analog pulses at several intermediate points as well as towards the digital markers and DACs.

The hardware abstraction layer (HAL) 213 may simultaneously configure both the model 215 and a corresponding DFV controller 219. The DFV controller 219 may be implemented in an FPGA, for example. The configuration may comprise storing desired values into the model 215 and the DFV controller 219.

The model 215 and the DFV controller 219 may store data in the DDR 217 or in an external memory device (not illustrated). During or after a quantum program execution, outputs from the model 215 and the DFV controller 219 may be compared via a memory comparison to determine if the test passed or failed. The program and comparison may be rerun for different time sample values to support a scale-up. For example, if up to 8 DACs may be sampled at a time per controller 207, the same experiment may be run 8 times, while storing the data in a different memory regions, to obtain validation data for 64 DACs per controller 207.

A serializer/deserializer (SERDES) may be connected to the DFV controller 219. The DFV controller 217 may also be connected to one or more different front end modules (FEMs) 221. The FEM 221 may connect with the DFV controller via any desired communication protocol that is sufficient to steadily transmit data in the desired rate (e.g. 2 Gsps analog pulse at 16 bit representation requires 32G bit communication). For example, a 128-bit data path at 250 MHz allows a 32 Gbps, which is the bandwidth required for a single 16-bit DAC operating at 2 Gbps. Each FEM may comprise 8 DACs, and each quantum controllers 103 may comprise 8 FEMs.

The DFV controller 219 processes and packs the received data from each FEM into the DDR format before the data is written to memory 217. The DFV controller 219 may pad samples that have a smaller width than the DDR, gather data into a packet, arbitrate different packets from the different FEMs, and convert the data to the DDR controller clock frequency. It may also write different FEM sources into different memory spaces in the DDR.

To allow capturing all DACs sources, it is possible to run the same program several times and capture a different set of DACs each time. Data may be compared against the programming model every run on some of the DACs. Alternatively, the data may be stored to a different memory region every time and the comparison may be performed after all of the data is collected.

In the DFV mode, the data used within the FEM 221 is buffered 217 for a point-to-point comparison with the bit-exact behavior model 215 of the QC. Selecting a subset of the data at any given time allows the DFV mode feedback to operate over a low bandwidth. The DAC bandwidth may be, for example, 32 Gbps using 2G samples per second and a 16-bit sample size. For a DDR bandwidth of 128 Gbps, for example, up to 4 DFV data streams (4 DACs for example) may be captured without losing data. If more samples are required, the same program may be run again while sampling at different time points.

The DFV data may be stored in a preconfigured address space of the memory 217. The DFV operation may be repeated with different DACs selected across the FEMs 221 for each operation.

The DFV controller 219 may further control the bandwidth, at the point of buffering and feedback, such that only one out of several sample values, sent to a particular DAC, are actually buffered and/or fed back. Digital signaling (e.g., digital markers) may also be buffered.

The activation of this DFV mode may be controlled by the HAL 213. For example, the application 205 may send an "Start DAC DFV" opcode to compiler 107 to enable the HAL 213 to configure the QC model 215 and DFV controller 219 to capture data as a quantum program begins. The execution of this opcode may be delayed to emulate the internal delay required to compute the relevant data and bring it to the DFV controller 219. To turn off the data capture when the program finishes, a DFV disable should be inserted with the last meaningful sample.

Dedicated logic also allows software to write data to internal memories that replicates qubit responses that arrive through the ADCs. The validation platform can run experiments emulating qubit responses following readout pulses without having actual quantum hardware and without having to connect DACs to ADCs in loopback. This logic can be activated, by software or by a classical processor in real time, to select data from dedicated memories instead of the ADCs when processing the inbound pulses for state estimation.

Each quantum controller 103 comprises software components 213, hardware components 221, a behavioral model 215 and a DFV controller 219. The software components 213 are configured to selectively (and seamlessly) interact with the hardware components 221 and/or the behavioral model 215. An interaction between the software components 213 and the hardware components 221 is independent of a parallel interaction between the software components 221 and the behavioral model 215. Also, the DFV controller 219 does not affect the resources of the quantum controller 103 used for normal operation. Therefore, the same functional program may run with or without DFV without the need to recompile.

The quantum controller 103 may be debugged while executing any source code. Furthermore, the environment may be replicated with compiled code when the source code is unavailable.

Figure 3:
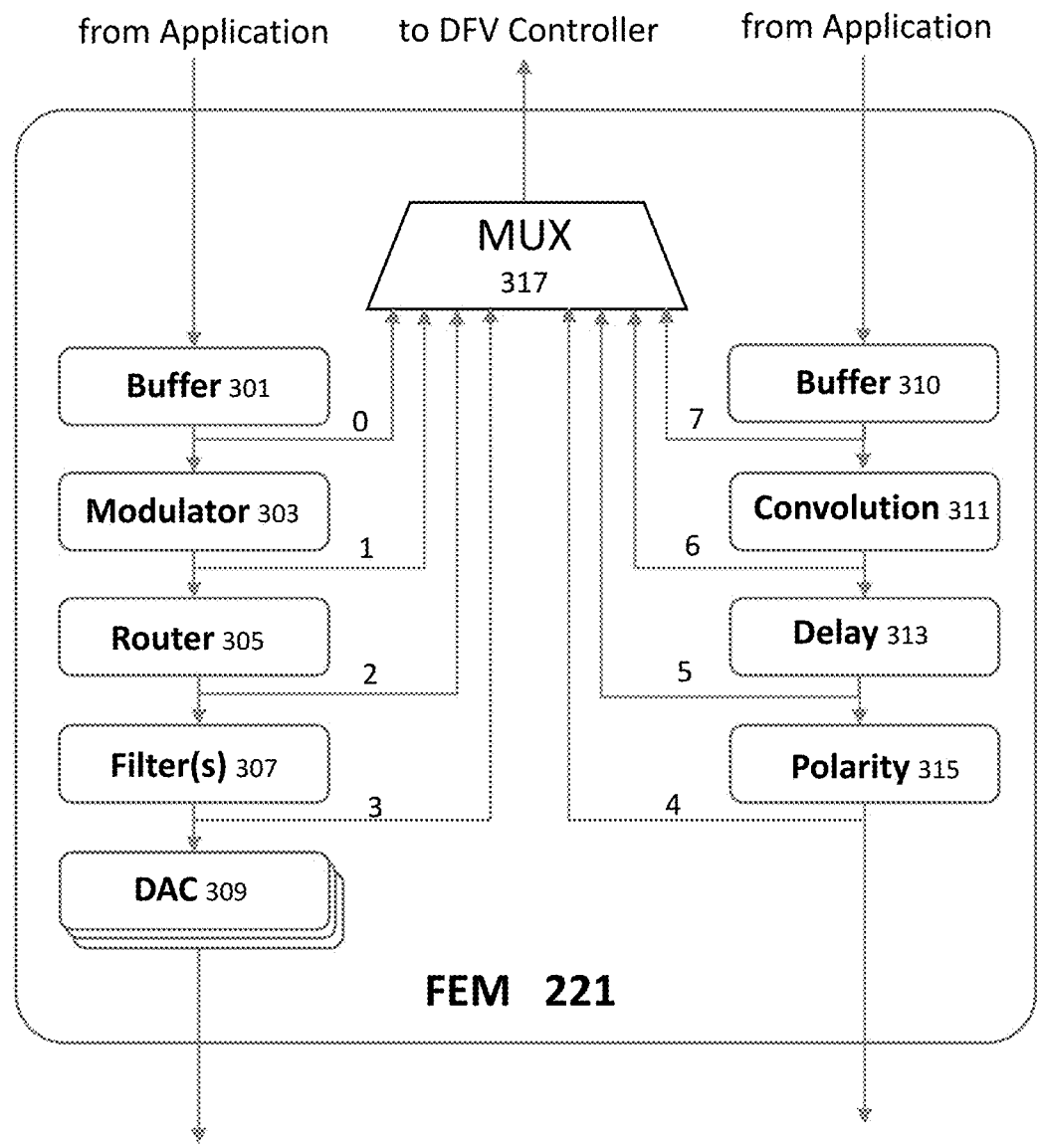
FIG. 3 illustrates optional extraction points for validation in accordance with various example implementations of this disclosure.

FIG. 3 illustrates optional extraction points for DFV in accordance with various example implementations of this disclosure.

The FEM 221 may buffer 301, modulate 303, route 305, and filter 307 the analog waveform before the DAC 309. The FEM 221 may also buffer 310, convolve 311, delay 313 and set the polarity 315 of the digital markers prior to outputting the digital markers so processed. The convolution 311 is with a dynamic kernel.

A MUX 317 inside each FEM 221 selects which validation data to send to the DFV controller. When DFV is enabled, an associated value in the opcode may be used as a data type selector according to the following encoding:

| | | |
|---|---|---|
| 0 | Analog Raw | value extracted from the buffer 301 and before modulation 303 |
| 1 | Analog Modulated | value after modulation 303 and before routing 305 to a DAC port |
| 2 | Analog Pre-Filters | value after routing 305 to a DAC port and before filter(s) 307 |
| 3 | Analog Out | value after filters 307 and before feeding the DAC 309 |
| 4 | Digital Markers Out | digital vector containing digital markers following polarity set 315 and before being output |
| 5 | Digital Markers Delayed | digital vector containing digital markers following delay 313 |
| 6 | Digital Markers Convoluted | digital vector containing digital markers following convolution with a dynamic kernel 311 |
| 7 | Digital Markers Raw | digital vector extracted from the buffer 310 and before convolution 311 with a dynamic kernel |

Figure 4:
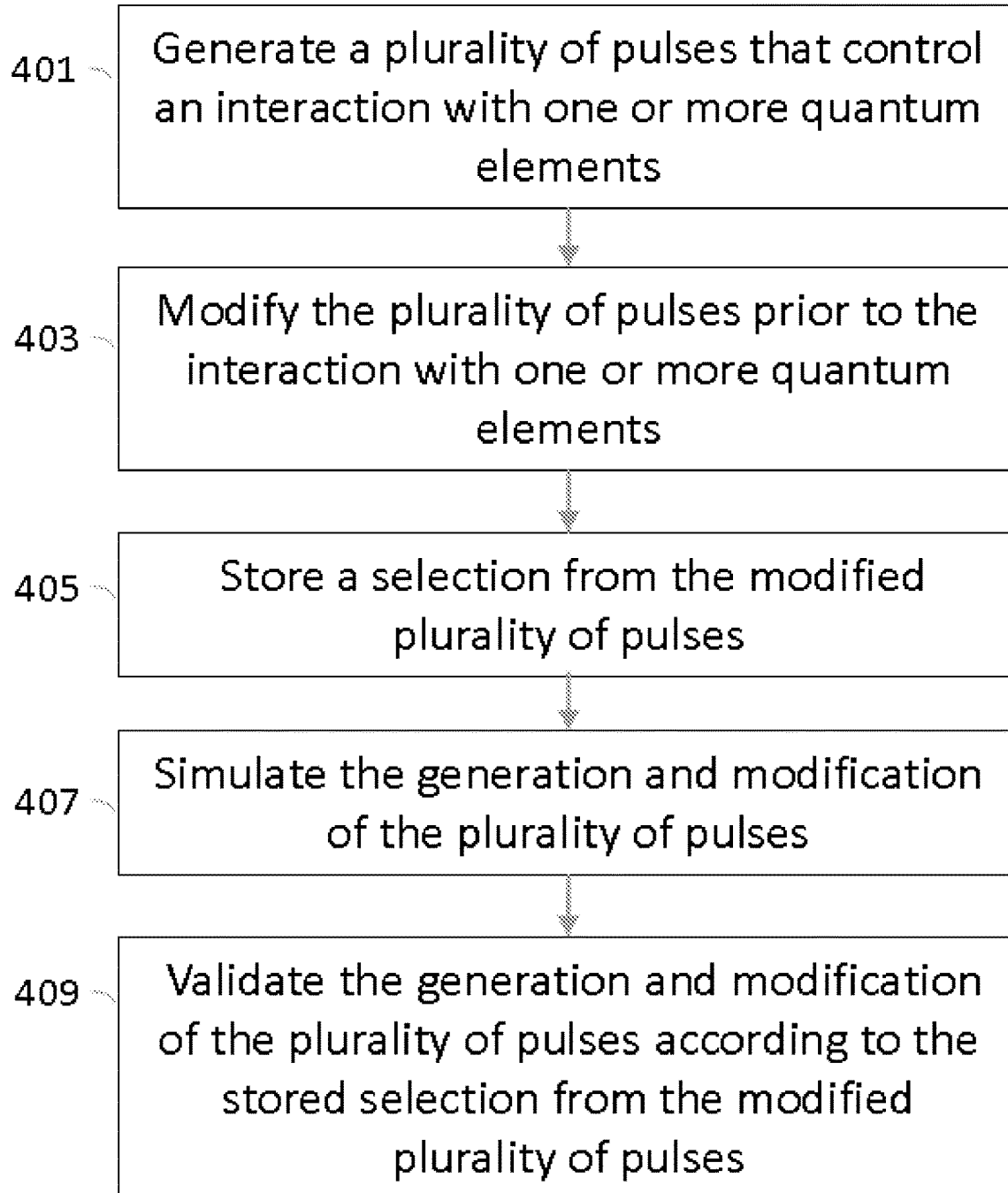
FIG. 4 illustrates a flowchart of an example method for QC validation in accordance with various example implementations of this disclosure.

FIG. 4 illustrates a flowchart of an example method for QC validation using a behavior model in accordance with various example implementations of this disclosure.

At 401, a plurality of raw pulses are generated by a pulse processor of the QC. The plurality of raw pulses are the basis for an interaction with one or more quantum elements in a quantum processor. The pulse processor is also able to generate a plurality of digital markers that may be associated with the plurality of pulses.

At 403, the plurality of raw pulses are modified in hardware by a front end module (FEM) of the QC. The FEM comprises a plurality of digital-to-analog converters (DACs) into which the modified pulses are routed. The DACs are operably coupled to an RF module to generate quantum control pulse that interact with one or more quantum elements.

The raw pulses may be modified via matrix multiplication, modulation, filtering and/or interpolation. The modifications may occur in one or both of the pulse processor and the FEM. During or after modification, the plurality of pulses are routed to one or more DACs.

At 405, a selection from the modified plurality of pulses is stored to memory (e.g., DDR memory or external memory, such as a hard drive). The path to the DDR memory may include intermediary buffering. For example, the pulse processor may comprise one or more application circuits that are operable to buffer the selection from the modified plurality of pulses.

The DDR memory is operable to store pulse samples that may be selected from throughout the QC. For example, the pulse samples may be taken from the modified plurality of pulses that result from the matrix multiplication, the modulation, the routing, the filtering and/or the interpolation. Each pulse of the plurality of pulses comprises a plurality of consecutive sample values that are sent to a DAC to generate an analog waveform. The sample that are stored in the memory may be consecutive samples or decimated samples, such that only one sample value out of several consecutive sample values is saved. The one or more of the generated digital markers may also be saved.

At 407, a computer processing unit (CPU) may be used to simulate the QC along with the generation and modification of the plurality of pulses.

At 409, the QC (including the generation and modification of the plurality of pulses and digital markers) is validated by the CPU according to the stored pulse samples.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a quantum controller comprising:
a plurality of software components;
a plurality of hardware components; and
a behavioral model, wherein:
the plurality of software components are configured to selectively interact with the plurality of hardware components and/or the behavioral model,
an interaction between the plurality of software components and the plurality of hardware components is independent of a parallel interaction between the plurality of software components and the behavioral model,
the plurality of software components are operable to generate a plurality of pulses that control an interaction with one or more quantum elements,
the plurality of hardware components comprise a front end module (FEM) operable to modify the plurality of pulses prior to the interaction with one or more quantum elements,
the quantum controller comprises a memory operable to store data extracted from the plurality of hardware components,
the data extracted from the plurality of hardware components corresponds to the modified plurality of pulses,
the quantum controller comprises a computer processing unit (CPU) configured to simulate the plurality of software components and the front end module, and
the CPU is operable to validate the plurality of software components and the front end module according to the simulation.

2. The system of claim 1, wherein:
the quantum controller comprises a design for validation (DFV) controller operable to extract data from the plurality of hardware components for validation.

3. The system of claim 1, wherein:
each pulse of the plurality of pulses comprises a plurality of consecutive analog values,
the plurality of consecutive analog values, once modified, are sent to one or more digital to analog converters (DACs), and
the data extracted from the plurality of hardware components comprises only one analog value out of several consecutive analog values.

4. The system of claim 1, wherein:
the plurality of hardware components comprise hardware logic configured to modify analog values from the plurality of software components,
the plurality of hardware components comprise hardware logic configured to modify digital markers from the plurality of software components, and
the quantum controller comprises a plurality of digital-to-analog converters (DACs).

5. The system of claim 1, wherein:
the plurality of hardware components comprises a buffer operable to receive a plurality of analog values from the plurality of software components,
the system comprises a memory operable to store one or more analog values of the plurality of analog values, and
the behavioral model is operable to simulate the one or more analog values for validation of the stored one or more analog values.

6. The system of claim 1, wherein:
the plurality of hardware components comprises a modulator operable to modulate a plurality of analog values from the plurality of software components, thereby generating a plurality of modulated analog values,
the system comprises a memory operable to store one or more modulated analog values of the plurality of modulated analog values, and
the behavioral model is operable to simulate the one or more modulated analog values for validation of the stored one or more modulated analog values.

7. The system of claim 1, wherein:
the plurality of hardware components comprises a router operable to route a plurality of analog values to a digital to analog converter (DAC), thereby generating a plurality of routed analog values,
the system comprises a memory operable to store one or more routed analog values of the plurality of routed analog values, and
the behavioral model is operable to simulate the one or more routed analog values for validation of the stored one or more routed analog values.

8. The system of claim 1, wherein:
the plurality of hardware components comprises one or more filters operable to filter a plurality of analog values, thereby generating a plurality of filtered analog values,
the system comprises a memory operable to store one or more filtered analog values of the plurality of filtered analog values, and
the behavioral model is operable to simulate the one or more filtered analog values for validation of the stored one or more filtered analog values.

9. The system of claim 1, wherein:
the plurality of hardware components comprises a buffer operable to receive a plurality of digital markers from the plurality of software components,
the system comprises a memory operable to store one or more digital markers of the plurality of digital markers, and
the behavioral model is operable to simulate the one or more digital markers for validation of the stored one or more digital markers.

10. The system of claim 1, wherein:
the plurality of hardware components comprises a convolution device operable to convolve a plurality of digital markers with a dynamic kernel, thereby generating a plurality of convolved digital markers, the system comprises a memory operable to store one or more convolved digital markers of the plurality of convolved digital markers, and the behavioral model is operable to simulate the one or more convolved digital markers for validation of the stored one or more convolved digital markers.

11. The system of claim 1, wherein:

the plurality of hardware components comprises a variable delay operable to delay a plurality of digital markers, thereby generating a plurality of delayed digital markers, the system comprises a memory operable to store one or more delayed digital markers of the plurality of delayed digital markers, and the behavioral model is operable to simulate the one or more delayed digital markers for validation of the stored one or more delayed digital markers.

12. The system of claim 1, wherein:

the plurality of hardware components comprises one or more polarity generators operable to set the polarity of a plurality of digital markers, thereby generating a plurality of polarized digital markers, the system comprises a memory operable to store one or more polarized digital markers of the plurality of polarized digital markers, and the behavioral model is operable to simulate the one or more polarized digital markers for validation of the stored one or more polarized digital markers.

13. A method comprising:

selecting, via a hardware abstraction layer (HAL), a design for validation (DFV) test of a quantum controller;

orchestrating an interaction between a plurality of software components of the quantum controller and a plurality of hardware components of the quantum controller;

independently orchestrating a parallel interaction between the plurality of software components of the quantum controller and a behavioral model of the quantum controller;

generating, via the plurality of software components, a plurality of pulses that control an interaction with one or more quantum elements;

modifying, via the plurality of hardware components, the plurality of pulses prior to the interaction with one or more quantum elements;

storing, in a memory, data extracted from the plurality of hardware components;

simulating, in a computer processing unit (CPU) of the quantum controller, the plurality of software components and the plurality of hardware components; and validating the plurality of software components and the plurality of hardware components according to the simulation and the stored data.

14. The method of claim 13, wherein the method comprises:

extracting, via a design for validation (DFV) controller, data from the plurality of hardware components for validation.

15. The method of claim 13, wherein the method comprises:

extracting the data from the plurality of hardware components, wherein the data comprises only one analog value out of several consecutive analog values.

16. The method of claim 13, wherein the method comprises:

modifying analog values from the plurality of software components;

modifying digital markers from the plurality of software components; and sending the modified analog values to a plurality of digital-to-analog converters (DACs) in coordination with outputting the modified digital markers.

17. The method of claim 13, wherein the method comprises:

buffering a plurality of analog values from the plurality of software components;

storing one or more analog values of the plurality of analog values; and simulating the one or more analog values for validation of the stored one or more analog values.

18. The method of claim 13, wherein the method comprises:

modulating a plurality of analog values from the plurality of software components, thereby generating a plurality of modulated analog values;

storing one or more modulated analog values of the plurality of modulated analog values; and simulating the one or more modulated analog values for validation of the stored one or more modulated analog values.

19. The method of claim 13, wherein the method comprises:

routing a plurality of analog values to a digital to analog converter (DAC), thereby generating a plurality of routed analog values;

storing one or more routed analog values of the plurality of routed analog values; and simulating the one or more routed analog values for validation of the stored one or more routed analog values.

20. The method of claim 13, wherein the method comprises:

filtering a plurality of analog values, thereby generating a plurality of filtered analog values;

storing one or more filtered analog values of the plurality of filtered analog values; and simulating the one or more filtered analog values for validation of the stored one or more filtered analog values.

21. The method of claim 13, wherein the method comprises:

buffering a plurality of digital markers from the plurality of software components;

storing one or more digital markers of the plurality of digital markers; and simulating the one or more digital markers for validation of the stored one or more digital markers.

22. The method of claim 13, wherein the method comprises:

convolving a plurality of digital markers with a dynamic kernel, thereby generating a plurality of convolved digital markers;

storing one or more convolved digital markers of the plurality of convolved digital markers; and simulating the one or more convolved digital markers for validation of the stored one or more convolved digital markers.

23. The method of claim 13, wherein the method comprises:

delaying a plurality of digital markers, thereby generating a plurality of delayed digital markers;

storing one or more delayed digital markers of the plurality of delayed digital markers; and simulating the one or more delayed digital markers for validation of the stored one or more delayed digital markers.

24. The method of claim 13, wherein the method comprises:

setting the polarity of a plurality of digital markers, thereby generating a plurality of polarized digital markers;

storing one or more polarized digital markers of the plurality of polarized digital markers; and simulating the one or more polarized digital markers for validation of the stored one or more polarized digital markers.

25. A system comprising:
a quantum controller comprising:
   a plurality of software components;
   a plurality of hardware components; and
   a behavioral model, wherein:
      the plurality of software components are configured to selectively interact with the plurality of hardware components and/or the behavioral model,
      an interaction between the plurality of software components and the plurality of hardware components is independent of a parallel interaction between the plurality of software components and the behavioral model,
      the plurality of hardware components comprises a convolution device operable to convolve a plurality of digital markers with a dynamic kernel, thereby generating a plurality of convolved digital markers,
      the system comprises a memory operable to store one or more convolved digital markers of the plurality of convolved digital markers, and
      the behavioral model is operable to simulate the one or more convolved digital markers for validation of the stored one or more convolved digital markers.

26. The system of claim 25, wherein:
the quantum controller comprises a design for validation (DFV) controller operable to extract data from the plurality of hardware components for validation.

27. The system of claim 25, wherein:
the plurality of hardware components comprise hardware logic configured to modify analog values from the plurality of software components,
the plurality of hardware components comprise hardware logic configured to modify digital markers from the plurality of software components, and
the quantum controller comprises a plurality of digital-to-analog converters (DACs).

28. The system of claim 25, wherein:
the plurality of hardware components comprises a buffer operable to receive a plurality of analog values from the plurality of software components,
the system comprises a memory operable to store one or more analog values of the plurality of analog values, and
the behavioral model is operable to simulate the one or more analog values for validation of the stored one or more analog values.

29. The system of claim 25, wherein:
the plurality of hardware components comprises a modulator operable to modulate a plurality of analog values from the plurality of software components, thereby generating a plurality of modulated analog values,
the system comprises a memory operable to store one or more modulated analog values of the plurality of modulated analog values, and
the behavioral model is operable to simulate the one or more modulated analog values for validation of the stored one or more modulated analog values.

30. The system of claim 25, wherein:
the plurality of hardware components comprises a router operable to route a plurality of analog values to a digital to analog converter (DAC), thereby generating a plurality of routed analog values,
the system comprises a memory operable to store one or more routed analog values of the plurality of routed analog values, and
the behavioral model is operable to simulate the one or more routed analog values for validation of the stored one or more routed analog values.

31. The system of claim 25, wherein:
the plurality of hardware components comprises one or more filters operable to filter a plurality of analog values, thereby generating a plurality of filtered analog values,
the system comprises a memory operable to store one or more filtered analog values of the plurality of filtered analog values, and
the behavioral model is operable to simulate the one or more filtered analog values for validation of the stored one or more filtered analog values.

32. The system of claim 25, wherein:
the plurality of hardware components comprises a buffer operable to receive a plurality of digital markers from the plurality of software components,
the system comprises a memory operable to store one or more digital markers of the plurality of digital markers, and
the behavioral model is operable to simulate the one or more digital markers for validation of the stored one or more digital markers.

33. The system of claim 25, wherein:
the plurality of hardware components comprises a variable delay operable to delay a plurality of digital markers, thereby generating a plurality of delayed digital markers,
the system comprises a memory operable to store one or more delayed digital markers of the plurality of delayed digital markers, and
the behavioral model is operable to simulate the one or more delayed digital markers for validation of the stored one or more delayed digital markers.

34. The system of claim 25, wherein:
the plurality of hardware components comprises one or more polarity generators operable to set the polarity of a plurality of digital markers, thereby generating a plurality of polarized digital markers,
the system comprises a memory operable to store one or more polarized digital markers of the plurality of polarized digital markers, and
the behavioral model is operable to simulate the one or more polarized digital markers for validation of the stored one or more polarized digital markers.

35. A method comprising:
selecting, via a hardware abstraction layer (HAL), a design for validation (DFV) test of a quantum controller;

orchestrating an interaction between a plurality of software components of the quantum controller and a plurality of hardware components of the quantum controller;
independently orchestrating a parallel interaction between the plurality of software components of the quantum controller and a behavioral model of the quantum controller;
convolving a plurality of digital markers with a dynamic kernel, thereby generating a plurality of convolved digital markers;
storing one or more convolved digital markers of the plurality of convolved digital markers; and
simulating the one or more convolved digital markers for validation of the stored one or more convolved digital markers.

36. The method of claim 35, wherein the method comprises:
extracting, via a design for validation (DFV) controller, data from the plurality of hardware components for validation.

37. The method of claim 35, wherein the method comprises:
modifying analog values from the plurality of software components;
modifying digital markers from the plurality of software components; and
sending the modified analog values to a plurality of digital-to-analog converters (DACs) in coordination with outputting the modified digital markers.

38. The method of claim 35, wherein the method comprises:
buffering a plurality of analog values from the plurality of software components;
storing one or more analog values of the plurality of analog values; and
simulating the one or more analog values for validation of the stored one or more analog values.

39. The method of claim 35, wherein the method comprises:
modulating a plurality of analog values from the plurality of software components, thereby generating a plurality of modulated analog values;
storing one or more modulated analog values of the plurality of modulated analog values; and
simulating the one or more modulated analog values for validation of the stored one or more modulated analog values.

40. The method of claim 35, wherein the method comprises:
routing a plurality of analog values to a digital to analog converter (DAC), thereby generating a plurality of routed analog values;
storing one or more routed analog values of the plurality of routed analog values; and
simulating the one or more routed analog values for validation of the stored one or more routed analog values.

41. The method of claim 35, wherein the method comprises:
filtering a plurality of analog values, thereby generating a plurality of filtered analog values;
storing one or more filtered analog values of the plurality of filtered analog values; and
simulating the one or more filtered analog values for validation of the stored one or more filtered analog values.

42. The method of claim 35, wherein the method comprises:
buffering a plurality of digital markers from the plurality of software components;
storing one or more digital markers of the plurality of digital markers; and
simulating the one or more digital markers for validation of the stored one or more digital markers.

43. The method of claim 35, wherein the method comprises:
delaying a plurality of digital markers, thereby generating a plurality of delayed digital markers;
storing one or more delayed digital markers of the plurality of delayed digital markers; and
simulating the one or more delayed digital markers for validation of the stored one or more delayed digital markers.

44. The method of claim 35, wherein the method comprises:
setting the polarity of a plurality of digital markers, thereby generating a plurality of polarized digital markers;
storing one or more polarized digital markers of the plurality of polarized digital markers; and
simulating the one or more polarized digital markers for validation of the stored one or more polarized digital markers.

45. A system comprising:
a quantum controller comprising:
a plurality of software components;
a plurality of hardware components; and
a behavioral model, wherein:
the plurality of software components are configured to selectively interact with the plurality of hardware components and/or the behavioral model,
an interaction between the plurality of software components and the plurality of hardware components is independent of a parallel interaction between the plurality of software components and the behavioral model,
the plurality of hardware components comprises one or more polarity generators operable to set the polarity of a plurality of digital markers, thereby generating a plurality of polarized digital markers,
the system comprises a memory operable to store one or more polarized digital markers of the plurality of polarized digital markers, and
the behavioral model is operable to simulate the one or more polarized digital markers for validation of the stored one or more polarized digital markers.

46. The system of claim 45, wherein:
the quantum controller comprises a design for validation (DFV) controller operable to extract data from the plurality of hardware components for validation.

47. The system of claim 45, wherein:
the plurality of hardware components comprise hardware logic configured to modify analog values from the plurality of software components,
the plurality of hardware components comprise hardware logic configured to modify digital markers from the plurality of software components, and
the quantum controller comprises a plurality of digital-to-analog converters (DACs).

48. The system of claim 45, wherein:
the plurality of hardware components comprises a buffer operable to receive a plurality of analog values from the plurality of software components, the system comprises a memory operable to store one or more analog values of the plurality of analog values, and the behavioral model is operable to simulate the one or more analog values for validation of the stored one or more analog values.

49. The system of claim 45, wherein:

the plurality of hardware components comprises a modulator operable to modulate a plurality of analog values from the plurality of software components, thereby generating a plurality of modulated analog values, the system comprises a memory operable to store one or more modulated analog values of the plurality of modulated analog values, and the behavioral model is operable to simulate the one or more modulated analog values for validation of the stored one or more modulated analog values.

50. The system of claim 45, wherein:

the plurality of hardware components comprises a router operable to route a plurality of analog values to a digital to analog converter (DAC), thereby generating a plurality of routed analog values, the system comprises a memory operable to store one or more routed analog values of the plurality of routed analog values, and the behavioral model is operable to simulate the one or more routed analog values for validation of the stored one or more routed analog values.

51. The system of claim 45, wherein:

the plurality of hardware components comprises one or more filters operable to filter a plurality of analog values, thereby generating a plurality of filtered analog values, the system comprises a memory operable to store one or more filtered analog values of the plurality of filtered analog values, and the behavioral model is operable to simulate the one or more filtered analog values for validation of the stored one or more filtered analog values.

52. The system of claim 45, wherein:

the plurality of hardware components comprises a buffer operable to receive a plurality of digital markers from the plurality of software components, the system comprises a memory operable to store one or more digital markers of the plurality of digital markers, and the behavioral model is operable to simulate the one or more digital markers for validation of the stored one or more digital markers.

53. The system of claim 45, wherein:

the plurality of hardware components comprises a variable delay operable to delay a plurality of digital markers, thereby generating a plurality of delayed digital markers, the system comprises a memory operable to store one or more delayed digital markers of the plurality of delayed digital markers, and the behavioral model is operable to simulate the one or more delayed digital markers for validation of the stored one or more delayed digital markers.

54. A method comprising:

selecting, via a hardware abstraction layer (HAL), a design for validation (DFV) test of a quantum controller;

orchestrating an interaction between a plurality of software components of the quantum controller and a plurality of hardware components of the quantum controller;

independently orchestrating a parallel interaction between the plurality of software components of the quantum controller and a behavioral model of the quantum controller;

setting the polarity of a plurality of digital markers, thereby generating a plurality of polarized digital markers;

storing one or more polarized digital markers of the plurality of polarized digital markers; and simulating the one or more polarized digital markers for validation of the stored one or more polarized digital markers.

55. The method of claim 54, wherein the method comprises:

extracting, via a design for validation (DFV) controller, data from the plurality of hardware components for validation.

56. The method of claim 54, wherein the method comprises:

modifying analog values from the plurality of software components;

modifying digital markers from the plurality of software components; and sending the modified analog values to a plurality of digital-to-analog converters (DACs) in coordination with outputting the modified digital markers.

57. The method of claim 54, wherein the method comprises:

buffering a plurality of analog values from the plurality of software components;

storing one or more analog values of the plurality of analog values; and simulating the one or more analog values for validation of the stored one or more analog values.

58. The method of claim 54, wherein the method comprises:

modulating a plurality of analog values from the plurality of software components, thereby generating a plurality of modulated analog values;

storing one or more modulated analog values of the plurality of modulated analog values; and simulating the one or more modulated analog values for validation of the stored one or more modulated analog values.

59. The method of claim 54, wherein the method comprises:

routing a plurality of analog values to a digital to analog converter (DAC), thereby generating a plurality of routed analog values;

storing one or more routed analog values of the plurality of routed analog values; and simulating the one or more routed analog values for validation of the stored one or more routed analog values.

60. The method of claim 54, wherein the method comprises:

filtering a plurality of analog values, thereby generating a plurality of filtered analog values;

storing one or more filtered analog values of the plurality of filtered analog values; and simulating the one or more filtered analog values for validation of the stored one or more filtered analog values.

61. The method of claim 54, wherein the method comprises:
- buffering a plurality of digital markers from the plurality of software components;
- storing one or more digital markers of the plurality of digital markers; and
- simulating the one or more digital markers for validation of the stored one or more digital markers.

62. The method of claim 54, wherein the method comprises:
- delaying a plurality of digital markers, thereby generating a plurality of delayed digital markers;
- storing one or more delayed digital markers of the plurality of delayed digital markers; and
  - simulating the one or more delayed digital markers for validation of the stored one or more delayed digital markers.

* * * * *